United States Patent [19]
Anstey

[11] Patent Number: 4,632,349
[45] Date of Patent: Dec. 30, 1986

[54] SUPPORT ASSEMBLY

[75] Inventor: Kenneth D. Anstey, Mt. Gravatt, Australia

[73] Assignee: Anstey Pty. Ltd., Acacia Ridge, Australia

[21] Appl. No.: 713,838

[22] Filed: Mar. 20, 1985

[30] Foreign Application Priority Data

Mar. 21, 1984 [AU] Australia .............................. PG4168

[51] Int. Cl.[4] .............................................. E04G 3/00
[52] U.S. Cl. .................................. 248/281.1; 108/96; 108/105; 248/655
[58] Field of Search ...................... 248/281.1, 274, 282, 248/284, 280.1, 278, 123.1, 655, 665, 631; 108/96, 92, 105, 145

[56] References Cited
U.S. PATENT DOCUMENTS

| | | | |
|---|---|---|---|
| 3,565,372 | 2/1971 | Jones et al. | 248/278 X |
| 4,082,244 | 4/1978 | Groff | 248/280.1 |
| 4,158,490 | 6/1979 | Gottschalk et al. | 248/631 X |
| 4,447,031 | 5/1984 | Sounder et al. | 248/280.1 |
| 4,546,708 | 10/1985 | Wilburth | 248/282 X |

Primary Examiner—Ramon O. Ramirez
Attorney, Agent, or Firm—Jeffrey H. Ingerman

[57] ABSTRACT

This invention relates to a support assembly for supporting a control device such as a keyboard relative to a fixed support such as a bench or table which may support visual display apparatus. The support assembly includes support means such as a table top or desk top for supporting the control device and attachment means such as an attachment bracket for attachment of the support assembly to the fixed support.

There is also included linkage means pivotally interconnecting each of the support means and attachment means. In the preferred form the linkage means includes an upper linkage arm and lower auxiliary support member forming a parallelogram linkage. There is also included fluid operated means for actuating movement of the linkage means whereby the support means may move in a direction spaced from the fixed support. Preferably the fluid operated means includes a cylinder mounted on a piston rod whereby relative movement may occur between the cylinder and piston rod upon compression or expansion of fluid within the cylinder. There also may be provided control means for controlling the fluid operated means accessible to a person sitting on the support means comprising a control lever or pedal operatively associated with the cylinder via an operating cable so as to cause compression or expansion of fluid within the cylinder.

32 Claims, 5 Drawing Figures

SUPPORT ASSEMBLY

BACKGROUND OF THE INVENTION

This invention relates to a support assembly for supporting a control device relative to a fixed support or location such as a wall, platform or bench.

This invention in one preferred aspect is especially suitable for supporting a keyboard or other finger-operated device relative to a workbench or table which may support visual display apparatus such as the visual display unit (V.D.U) of a computer, word processor or other electronic equipment.

Hitherto it has been highly desirable to design apparatus for supporting a keyboard relative to a VDU whereby the keyboard was height adjustable relative to the VDU for the main reason that the position of keyboard operator was one that could be filled by a number of people of different heights who therefore would require varying keyboard heights for individual comfort and also to achieve maximum working efficiency. Such support apparatus would be considered preferable for example to apparatus that could only support the keyboard at a fixed height relative to the VDU such as a rigid support bracket interconnecting the keyboard carrier to a table carrying the VDU.

In one conventional apparatus of the type described above there was provided a keyboard support which was mounted on a tubular support shaft wherein a rod or tube attached to the keyboard support was telescopically engageable with the tubular support shaft and there was provided jacking means to make the keyboard support height adjustable relative to the support shaft. Located adjacent the keyboard support was the work platform or table. While this arrangement was satisfactory in some respects it was found that it was bulky or cumbersome and was difficult to operate by inexperienced personnel such as junior typists. Also the actuating mechanism for initiating movement of the keyboard support was often inaccessible.

In another conventional arrangement there was provided a keyboard support which was connected by a linkage arm to a fixed table which carried a VDU. The linkage arm operated on a pantograph or parallelogram linkage which was controlled by springs. When it was desired to lock the keyboard support in a desired position relative to the VDU it was necessary to actuate a mechanical locking arrangement which again was not always the most appropriate arrangement to be operated by inexperienced personnel. Also because of the spring control means often the movement of the keyboard support relative to the VDU was uncontrolled or jerky and did not give a smooth controlled movement. Also the mechanical locking arrangement was also found to be relatively difficult to operate in the case of inexperienced personnel and often the locking arrangement was relatively inaccessible to the operator.

SUMMARY OF THE INVENTION

It is therefore an object of the invention to provide a support assembly which may alleviate the abovementioned problems associated with the prior art.

The support assembly of the invention includes support means for supporting the control device; attachment means for attachment of the support assembly to the fixed support; linkage means pivotally interconnecting each of the support means and attachment means; and fluid operated means for actuating movement of the linkage means wherein said support means may move in a direction spaced from the fixed support.

The support means suitably comprises a bench, tabletop, desk or other suitable flat or planar surface for supporting a keyboard, machine or other implement or device.

The attachment means may comprise an attachment bracket to a vertical surface such as a wall or horizontal surface such as a bench or table. Preferably the attachment bracket is bifurcated having a web and opposed arms which have a pair of aligned apertures for the insertion therethrough of a first or top pivot pin and a second or lower pivot pin for a reason as hereinafter discussed. The web may be attached to an adjacent vertical surface of a structural member of the table or bench. The attachment bracket may also include a pair of opposed downwardly extending lugs which also have a pair of opposed appertures for the insertion therethrough of a third pivot pin for a reason as hereinafter discussed.

The linkage means is suitably a linkage arm of integral or one piece construction which preferably is of channel shape having a top web and a pair of downwardly extended and opposed flanges. The rear end of the linkage arm may be provided with a pair of outwardly extending ears or lugs for mounting of the aforementioned top pivot pin which attaches the rear end of the linkage arm to the attachment bracket.

However it will be appreciated that the linkage means or linkage arm may be of any suitable shape other than that described above such as being substantially planar or platelike if desired having a pair of opposed broad surfaces and a pair of opposed narrow surfaces or edges.

There also may be provided mounting means such as a mounting bracket attaching the front end of the linkage arm to the support means. Preferably the mounting bracket may adopt the same shape as the attachment bracket having a channel shape with a front web and opposed rearwardly extending flanges. The mounting bracket may also include a top pivot pin for pivotally supporting the front end of the linkage arm and a second pin for a reason as hereinafter discussed.

The fluid operated means for actuating pivotal movement of the linkage arm may be hydraulic or pneumatic in nature. Preferably however the fluid operated means is a gas spring including a cylinder mounted on a piston rod whereby suitably relative movement may occur between the cylinder and the piston rod so as to compress gas within the cylinder. A suitable gas spring for use in the invention is one marketed under the SUSPA trade mark or BLOCK-O-LIFT trade mark and manufactured by West German firms.

In a preferred form of gas spring for use in the invention there may be provided an inner sleeve or piston having a central gas chamber and an outer concentric gas chamber. Relative movement may occur between the inner sleeve and an outer sleeve or cylinder containing an end gas chamber. At its free end or end remote from the outer sleeve the inner sleeve may contain a valve mechanism having a valve stem initially movable downwardly or inwardly relative to the surrounding inner sleeve to reach an open position so as to allow communication between the central gas chamber, the concentric gas chamber and the end chamber. In a compression stroke gas exits from the central gas chamber to the end chamber via the concentric chamber and in an expansion stroke the reverse occurs. In either the compression stroke or expansion stroke relative movement occurs between the cylinder and piston.

There also may be provided control means for controlling the fluid operated means. In one form this may comprise a valve for controlling flow of fluid into or out of the cylinder with specific reference to a hydraulic ram assembly or pneumatic ram assembly. With specific reference to the embodiment described above this may comprise a control lever attached to an operating cable which is secured to a lug pivotally mounted to a holding bracket interposed between the rear attachment bracket and the piston of the gas spring referred to above. The pivoted lug may be attached to the valve stem of the valve mechanism previously described. Upon movement of the operating cable this may effect inward movement of the valve stem to cause the cylinder to move relative to the piston which is fixed in this particular embodiment.

In another form the control means may comprise a foot or knee operated pedal for causing movement of the operating cable in substitution of a finger operated control lever as described above.

In an alternative embodiment the attachment bracket may be associated with a track or channel member for reciprocation in a forward or reverse direction which track may be attached to the underside of a bench or table supporting the VDU. In this embodiment there also may be provided means for pivoting the assembly of support means and linkage means about a vertical axis so that the assembly may be moved rearwardly, whereby said attachment bracket may move on the track and subsequently pivoted so as to be retracted or be located underneath the table or bench supporting the VDU.

BRIEF DESCRIPTION OF THE DRAWINGS

Reference may now be made to a preferred embodiment of the invention as shown in the accompanying drawings wherein.

DETAILED DESCRIPTION OF THE INVENTION

Figure 1:
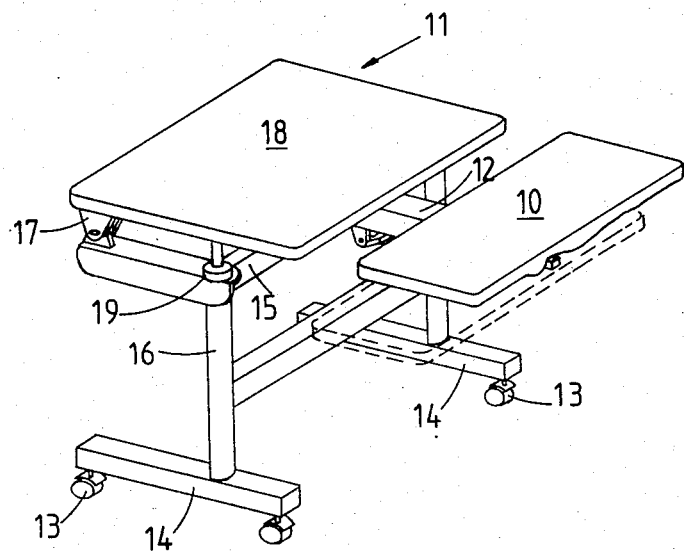
FIG. 1 is a perspective view of a support assembly constructed in accordance with the invention.

In the drawings there is shown keyboard support 10 and work table 11 and linkage arm 12 interconnecting support 10 and work table 11. Work table 11 is mounted on castors 13 and includes horizontal legs 14, uprights 16 and frame members 15. There is also shown pivot joints 17 interconnecting tabletop 18 to frame members 15 and angle adjustment mechanism 19 for adjustment of the angle of tabletop 18 relative to the horizontal.

The linkage arm 12 is attached to rear attachment bracket 20 and also to front mounting bracket 21. Bracket 20 includes opposed sides 22 and downwardly extending lugs 23. The web 24 of bracket 20 is welded to frame member 15. There is also shown top pivot pin 25 pivotally attaching linkage arm 12 to bracket 20.

The linkage arm 12 is channel shaped as shown having opposed side walls 26 and top web 27 and is bent or curved at 28 so as to allow keyboard support 10 to be located in substantially the same horizontal plane as tabletop 18 if desired.

There is also shown front mounting bracket 21 which is also channel shaped having opposed sides 29, and web part or mounting plate 30 which has attachment plate 31 welded thereto. Plate 31 has attachment apertures 32 for attachment to keyboard 10 by bolts or screws (not shown). There is also shown top pivot pin 33 pivotally attaching bracket 21 to linkage arm 12.

Figure 2:
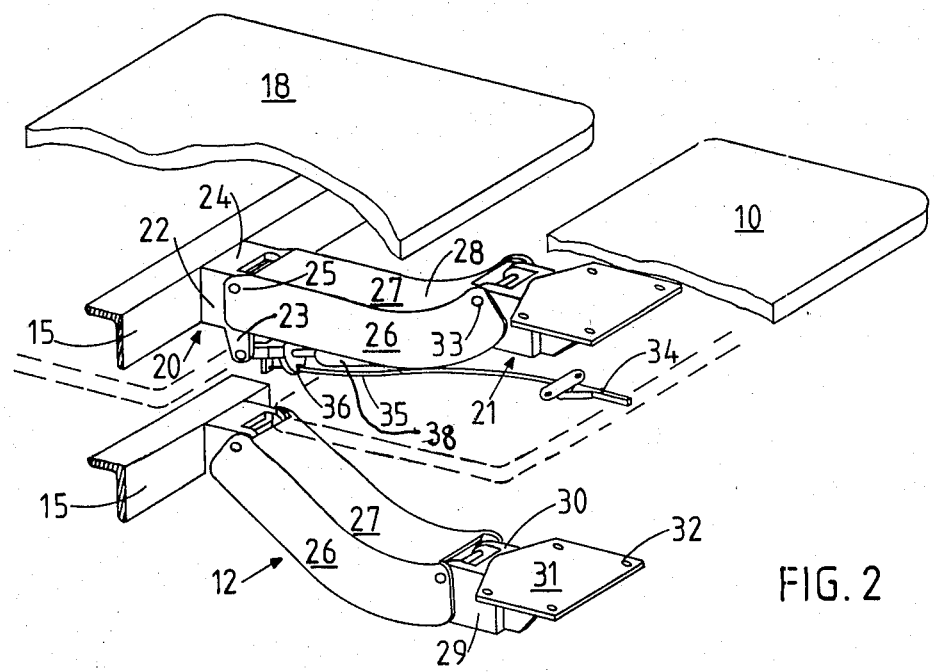
FIG. 2 is a partly broken away perspective view of the linkage arm interconnecting the keyboard support and the work table which supports the VDU of the assembly shown in FIG. 1.
Figure 4:
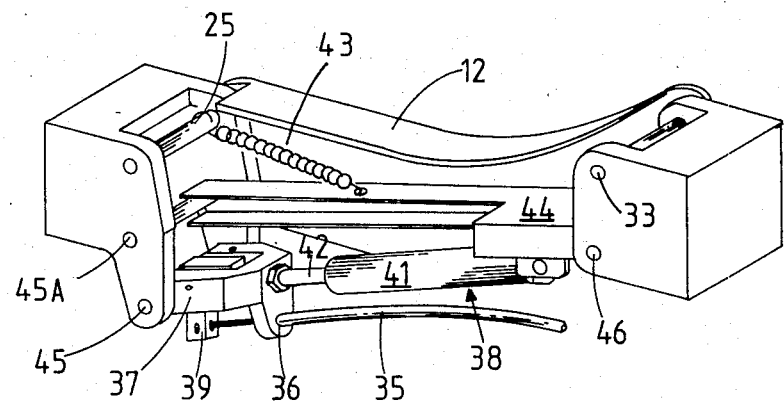
FIG. 4 is a view similar to FIG. 2 but showing portion of the linkage arm broken away to illustrate the gas spring and support member therefor.

Also shown is control lever 34 which is readily accessible to the operator of keyboard support 10 as shown. Lever 34 controls operation of operating cable 35 which extends through aperture 36 of end mounting member 37 of gas spring 38 best shown in FIG. 4. Mounting member 37 also has a pivoted lug 39 which when pulled forwardly by cable 35 actuates the valve member (not shown) of gas spring 38 thereby resulting in actuation of gas spring 38 whereby cylinder 41 will move on piston rod 42 to thereby pivot linkage arm 12 relative to brackets 20 and 21. In FIG. 1 or FIG. 4 the gas spring 38 is shown in an extended position whereby keyboard support 10 is substantially in the same horizontal plane as tabletop 18. In a retracted position the keyboard support 10 will be located below tabletop 18 as best shown in FIG. 2 in dotted outline wherein piston rod 42 will be fully retracted within cylinder 41. There is also shown tension spring 43 attached to top pivot pin 25 which is also attached to support member 44 for gas spring 38.

There are also shown bottom pivot pins 45, 45A and 46 of rear bracket 20 and front bracket 21 which pivotally attach support member 44 to both brackets 20 and 21 as best shown in FIG. 4. Tension spring 43 biases keyboard support to the upper position as is also shown in FIG. 4.

Figure 3:
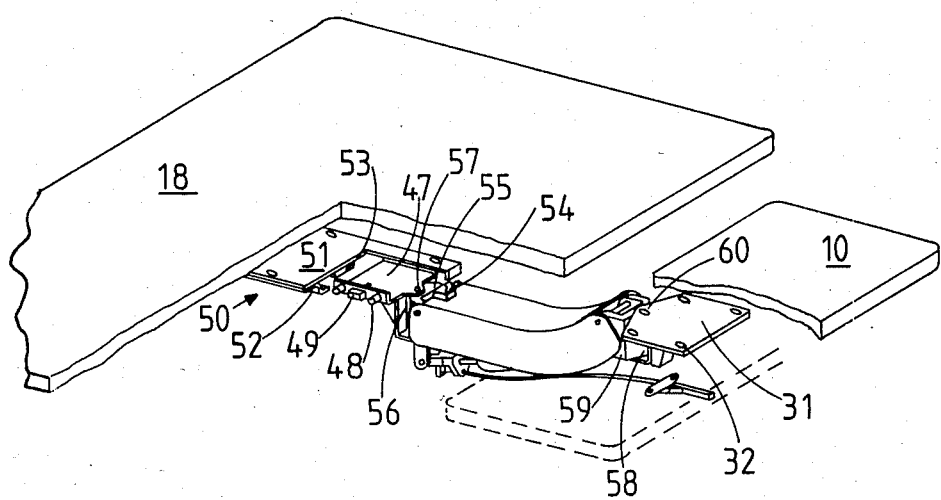
FIG. 3 is a perspective view of the modified support assembly constructed in accordance with the invention.
Figure 3A:
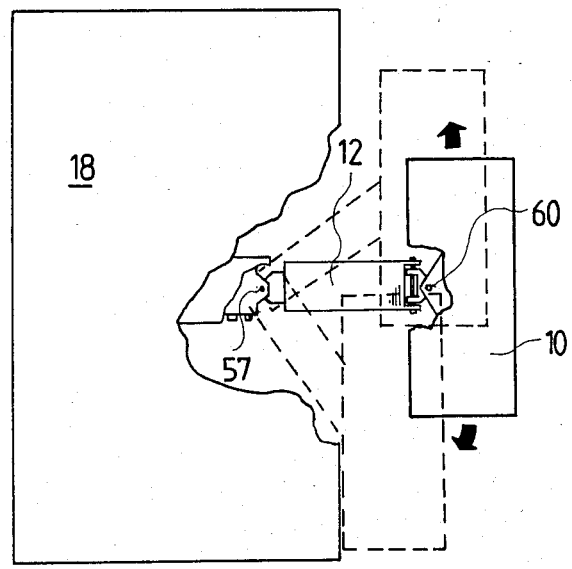
FIG. 3a is a top plan view of the modified support assembly shown in FIG. 3; and p

In FIGS. 3 and 3a the rear bracket 20 is modified so as to be attached to a slider plate 47 having roller bearings 48 and friction pad 49 made of resilient material. The slider plate 47 may reciprocate back and forth on track or channel 50 having a top plate component 51 and track rails 52. There is also shown stop member 53 and mating stop member 54 on linkage arm 12 which prevents keyboard support 10 from moving below tabletop 18 in any position other than the lowest or minimum position. There is also shown rear pivot block 55 having adjacent bearing faces 56 which is mounted on vertical pivot pin 57 and front pivot block 59 having adjacent bearing faces 58 which is mounted on from vertical pivot pin 60.

In the lowest or minimum position as shown in dotted outline keyboard support 10 may be fully retracted below tabletop 18. Both keyboard support 10 and linkage arm 12 are independently pivotable as shown by the arrows. This is useful in the situation where two people are sharing the same keyboard mounted on keyboard support 10.

In operation of the abovementioned preferred embodiment the keyboard support 10 may be adjusted infinitely insofar as height adjustment is concerned relative to tabletop 18 by actuation of control lever 34. When it is desired to lower keyboard support 10 the gas spring 37 will be in a compression stroke as described previously and when the keyboard support 10 is being elevated the gas spring 37 will be in an expansion stroke.

The support assembly is therefore constructed with a view to providing appropriate vertical adjustment of keyboard support 10 relative to tabletop 18 with the least physical effort. The provision of pivot pins 25, 45A,33 and 46 provide a parallelogram linkage between the keyboard support 10 and the fixed frame member 15 constituted by linkage arm 12 and support member 44.

What is claimed is:

1. A support assembly for supporting a control device relative to a fixed support including:
    support means for supporting the control device;
    attachment means for attachment of the support assembly to the fixed support;
    linkage means pivotally interconnecting each of the support means and attachment means;
    pivotal mounting means pivotally attaching the linkage means to the support means;
    fluid operated means for actuating movement of the linkage means wherein said support means may move in a direction spaced from the fixed support, said fluid operated means being pivotally attachable to the attachment means and to the pivotal mounting means, and including a cylinder mounted on a piston rod, whereby relative movement may occur between the cylinder and the piston rod upon compression or expansion of fluid within the cylinder; and
    control means for controlling the fluid operated means accessible to a person sitting on the support means, said control means comprising a control lever or pedal operatively associated therewith so as to cause said compression or expansion of fluid within the cylinder.

2. A support assembly as claimed in claim 1 wherein the support means includes a substantially planar support surface which in use is oriented in a direction substantially parallel to a corresponding planar support surface of the fixed support.

3. A support assembly as claimed in claim 1 wherein the attachment means includes an attachment bracket having a pair of adjacent arms and a pivot pin interconnecting each arm and operatively attached to the linkage means.

4. A support assembly as claimed in claim 3 wherein the attachment bracket also includes a web interconnecting each adjacent arm thereof and attachable to a mating surface of the fixed support.

5. A support assembly as claimed in claim 1 wherein the linkage means includes a linkage arm which is curved or tapered intermediate its length so as to facilitate the support means to be located in a common horizontal plane with the fixed support if desired.

6. A support assembly as claimed in claim 5 wherein the linkage arm is channel-shaped, having a top web and pair of opposed flanges.

7. A support assembly as claimed in claim 1 wherein the pivotal mounting means includes a mounting bracket having a pair of adjacent arms and an interconnecting web attached to the support means.

8. A support assembly as claimed in claim 7 wherein there is further provided a pivot pin interconnecting each adjacent arm and operatively associated with the linkage means.

9. A support assembly as claimed in claim 1 wherein there is further provided a lug pivotally mounted to a holding bracket operatively associated with the fixed support and which lug is attached to a control cable associated with the control means wherein said lug is actuated to cause said compression or expansion of fluid within cylinder.

10. A support assembly for supporting a control device relative to a fixed support including:
    support means for supporting the control device;
    attachment means for attachment of the support assembly to the fixed support, said attachment means being operatively associated with a track member for reciprocation in a forward or reverse direction attachable to the fixed support;
    linkage means pivotally interconnecting each of the support means and attachment means; and
    fluid operated means for actuating movement of the linkage means wherein said support means may move in a direction spaced from the fixed support.

11. A support assembly as claimed in claim 10 wherein there is also provided means for pivoting a sub assembly comprising the linkage means, support means and the fluid operated means about a vertical axis so that the sub assembly may be pivoted in a direction below the machine support upon rearward movement of the attachment means along the track or channel member.

12. A support assembly as claimed in claim 10 wherein the support means includes a substantially planar support surface which in use is oriented in a direction substantially parallel to a corresponding planar support surface of the fixed support.

13. A support assembly as claimed in claim 10 wherein the attachment means includes an attachment bracket having a pair of adjacent arms and a pivot pin interconnecting each arm and operatively attached to the linkage means.

14. A support assembly as claimed in claim 13 wherein the attachment bracket also includes a web interconnecting each adjacent arm thereof and attachable to a mating surface of the fixed support.

15. A support assembly as claimed in claim 10 wherein the linkage means includes a linkage arm which is curved or tapered intermediate its length so as to facilitate the support means to be located in a common horizontal plane with the fixed support if desired.

16. A support assembly as claimed in claim 15 wherein the linkage arm is channel-shaped, having a top web and pair of opposed flanges.

17. A support assembly as claimed in claim 10 wherein there is provided mounting means pivotally attaching the linkage means to the support means.

18. A support assembly as claimed in claim 17 wherein the pivotal mounting means includes a mounting bracket having a pair of adjacent arms and an interconnecting web attached to the support means.

19. A support assembly as claimed in claim 18 wherein there is further provided a pivot pin interconnecting each adjacent arm and operatively associated with the linkage means.

20. A support assembly as claimed in claim 19 wherein the fluid operated means is pivotally attachable to the attachment means and to the pivotal mounting means, and includes a cylinder mounted on a piston rod, whereby relative movement may occur between the cylinder and the piston rod upon compression or expansion of fluid within the cylinder.

21. A support assembly for supporting a control device relative to a fixed support including:

support means for supporting the control device;

attachment means for attachment of the support assembly to the fixed support;

linkage means pivotally interconnecting each of the support means and attachment means, said linkage means including a linkage arm which is curved or tapered intermediate its length so as to facilitate the support means to be located in a common horizontal plane with the fixed support if desired;

fluid operated means for actuating movement of the linkage means wherein said support means may move in a direction spaced from the fixed support; and an auxiliary support member forming part of the linkage means and interposed between the linkage arm and the fluid operated means, pivotally attached to the attachment means and the pivotal mounting means, to complete a parallelogram linkage between the support means and the attachment means.

22. A support assembly as claimed in claim 21 wherein there is provided biasing means attached to the attachment means and the auxiliary support member to bias the support means to an upper operative position.

23. A support assembly as claimed in claim 22 wherein the biasing means is a tension spring interconnecting the auxiliary support member on an associated pivot pin of the attachment means.

24. A support assembly as claimed in claim 21 wherein the support means includes a substantially planar support surface which in use is oriented in a direction substantially parallel to a corresponding planar support surface of the fixed support.

25. A support assembly as claimed in claim 21 wherein the attachment means includes an attachment bracket having a pair of adjacent arms and pivot pin interconnecting each arm and operatively attached to the linkage means.

26. A support assembly as claimed in claim 25 wherein the attachment bracket also includes a web interconnecting each adjacent arm thereof and attachable to a mating surface of the fixed support.

27. A support assembly as claimed in claim 21 wherein the linkage arm is channel-shaped, having a top web and a pair of opposed flanges.

28. A support assembly as claimed in claim 21 wherein there is provided pivotal mounting means pivotally attaching the linkage means to the support means.

29. A support assembly as claimed in claim 28 wherein the pivotal mounting means includes a mounting bracket having a pair of adjacent arms and an interconnecting web attached to the support means.

30. A support assembly as claimed in claim 29 wherein there is further provided a pivot pin interconnecting each adjacent arm and operatively associated with the linkage means.

31. A support assembly as claimed in claim 30 wherein the fluid operated means is pivotally attachable to the attachment means and the pivotal mounting means, and includes a cylinder mounted on a piston rod, whereby relative movement may occur between the cylinder and the piston rod upon compression or expansion of fluid within the cylinder.

32. A support assembly for supporting a keyboard or other finger operated control device relative to a fixed support for visual display apparatus including-support means including an upper planar support surface;

attachment means attachable to said fixed support;

mounting means attachable to said support means;

linkage means interposed between the mounting means and the attachment means and pivotally connected to each of said mounting means and attachment means;

fluid actuated means for actuating movement of the linkage means;

an auxiliary support member for supporting the fluid actuated means and pivotally connected to the fluid actuated means;

holding means pivotally attached to the attachment means and connected to the fluid actuated means and further including a lug pivotally mounted thereon operatively associated with the fluid actuated means so as to facilitate expansion or compression of fluid contained therein; and control means for controlling the fluid actuated means accessible to a person sitting on the support means including a control cable attached to said pivoted lug.

* * * * *

UNITED STATES PATENT AND TRADEMARK OFFICE
CERTIFICATE OF CORRECTION

PATENT NO. : 4,632,349

DATED : December 30, 1986

INVENTOR(S) : Kenneth D. Anstey

It is certified that error appears in the above-identified patent and that said Letters Patent is hereby corrected as shown below:

Column 3, line 52, "p" should be deleted.

Claim 17, line 2, after "provided" should be inserted -- pivotal --.

Signed and Sealed this

First Day of September, 1987

Attest:

DONALD J. QUIGG

Attesting Officer

Commissioner of Patents and Trademarks